(No Model.) 3 Sheets—Sheet 1.
T. H. NACE.
ENGINE GOVERNOR.
No. 480,778. Patented Aug. 16, 1892.
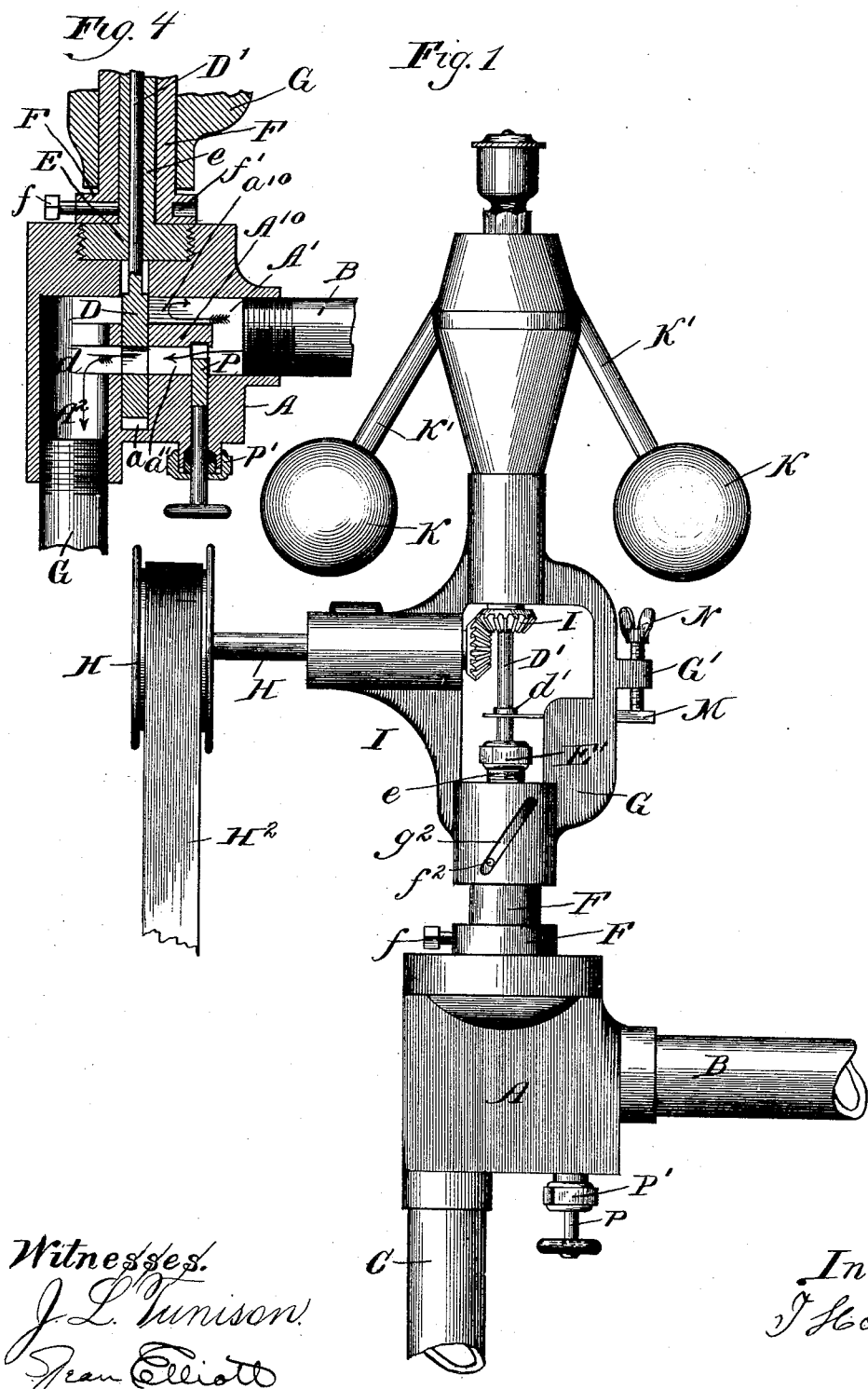
Witnesses.
J. L. Tunison
Jean Elliott
Inventor:
T. H. Nace

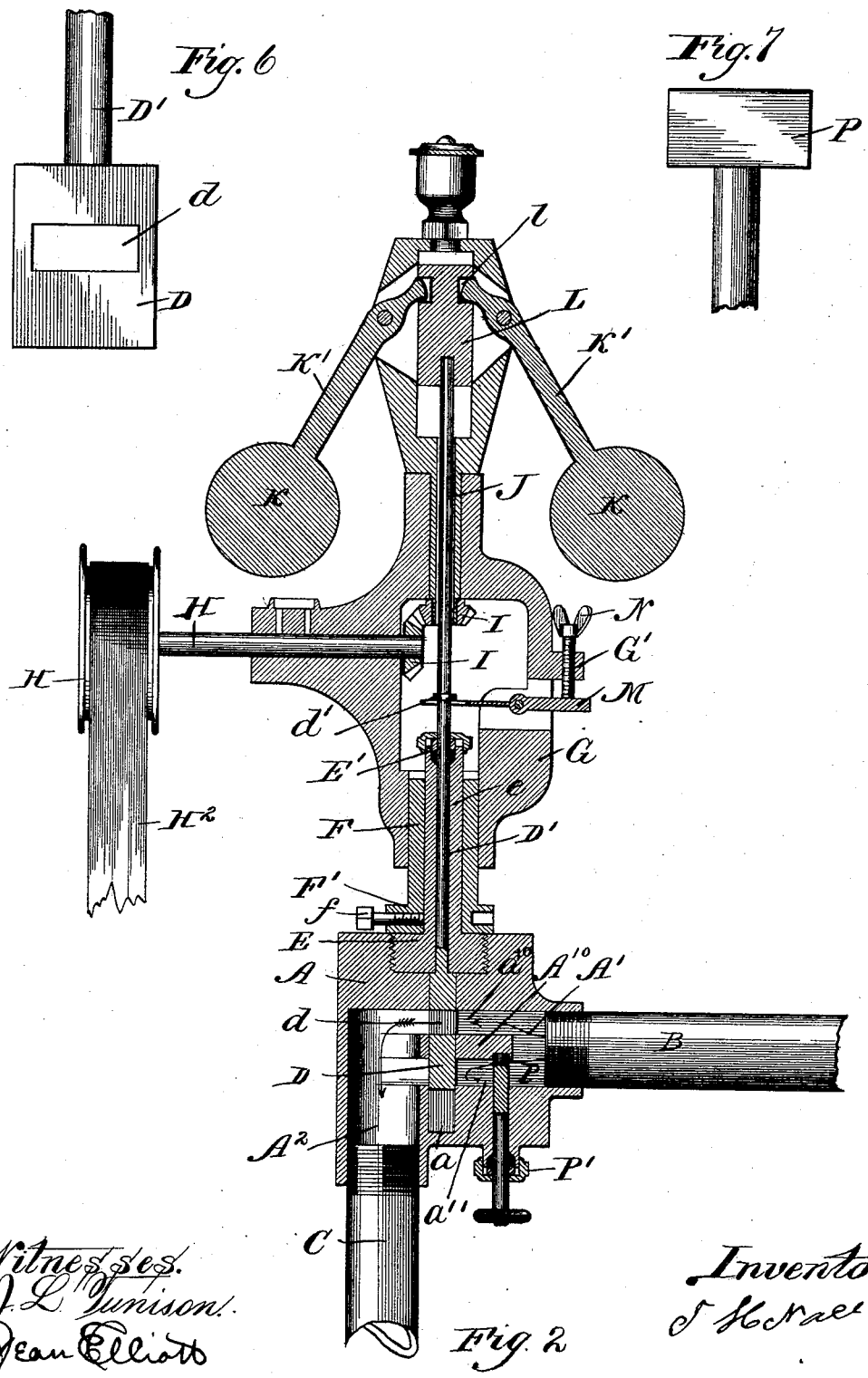

(No Model.) 3 Sheets—Sheet 3.
T. H. NACE.
ENGINE GOVERNOR.
No. 480,778. Patented Aug. 16, 1892.
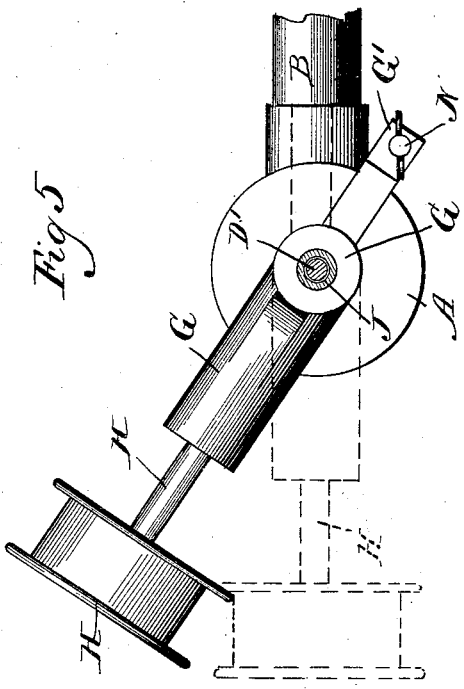
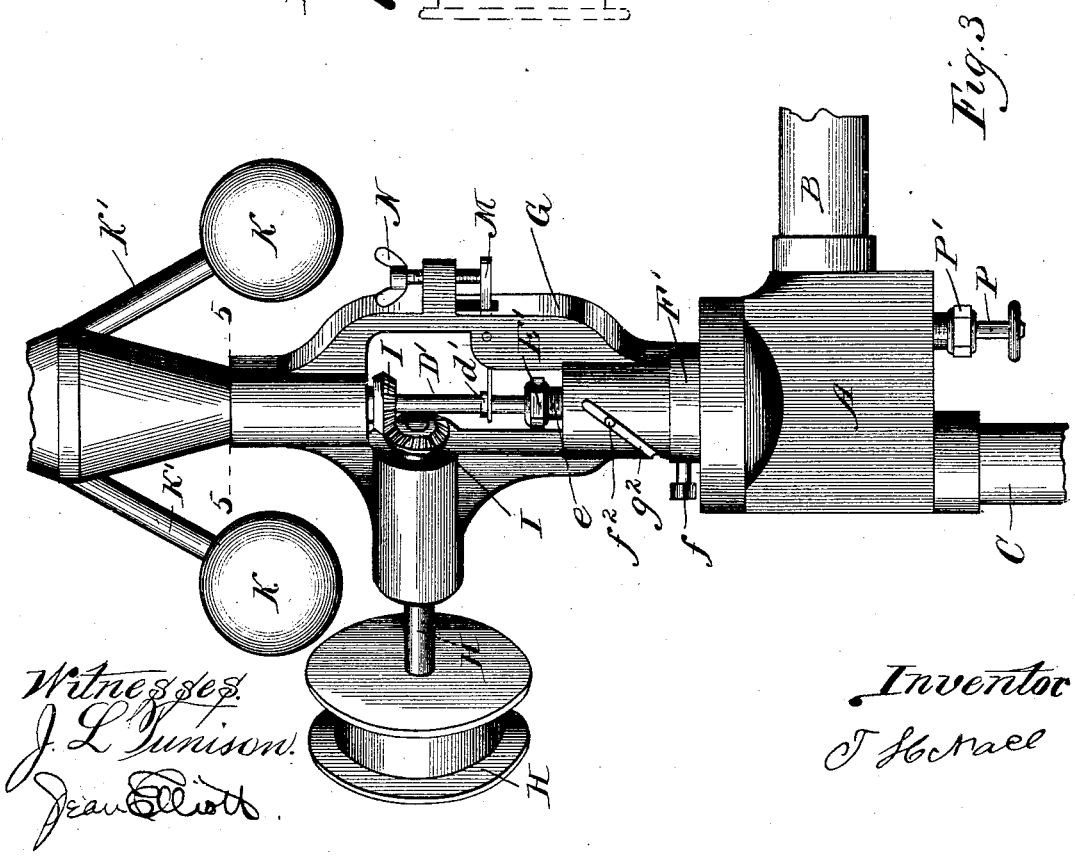
Witnesses.
J. L. Tunison.
Jean Elliott.
Inventor
T H Nace

UNITED STATES PATENT OFFICE.

THOMAS H. NACE, OF CHICAGO, ILLINOIS.

ENGINE-GOVERNOR.

SPECIFICATION forming part of Letters Patent No. 480,778, dated August 16, 1892.

Application filed December 4, 1891. Serial No. 413,994. (No model.)

*To all whom it may concern:*

Be it known that I, THOMAS H. NACE, a citizen of the United States, residing at Chicago, county of Cook, and State of Illinois, have invented certain new and useful Improvements in Engine-Governors, which are fully set forth in the following specification, reference being had to the accompanying drawings, forming a part thereof.

The chief purpose of this invention is to provide means for preventing the damage which results from the breaking or displacement of the belt which drives the centrifugal governor of an engine. Such an accident in the absence of special precautions to prevent the result by bringing the governor to a standstill first opens wide the steam-passage, giving to the engine the full head of steam and depriving the engine of any control, and permits it to run unchecked at its maximum speed to the great damage, often, both to the engine and the machinery driven thereby. Devices which have been heretofore employed to prevent this result have caused the steam to be entirely shut off by the breaking or displacement of the belt and bringing the engine to an entire stop. This often causes serious damage to work which is done by the machinery driven by the engine when such work requires continuity of action. An instance of work of this class is roasting or desiccating apparatus, which if allowed to come to a standstill, so that the agitation of the matter ceases, will cause the matter being operated upon to be burned or otherwise damaged. Many other instances of mechanical processes will readily occur to the mechanic wherein the perfection of the work of a tool depends upon its maintaining a high speed, and not only the tool but the work being operated upon will be injured by attempting to work at low speed. I aim, therefore, by this invention not only to provide a new means for shutting off the steam when the belt breaks or is displaced, but also to provide a means which will permit the engine still to run but at any desired speed which may be predetermined by properly setting the device.

In the drawings, Figure 1 is an elevation of my improved governor and its connections to the steam-pipe and driving-belt, the parts being shown in the position occupied when the driving-belt is in position. Fig. 2 is an axial section through the valve-stem of my governor in the plane of the axis of the shaft of the driving-pulley. Fig. 3 is an elevation of the governor with the parts in the position which they will assume when the belt is displaced by breaking or otherwise. Fig. 4 is a detail section of the governor cut-off valve and steam-passages controlled thereby when the parts are in the position shown in Fig. 3. Fig. 5 is a sectional plan showing the change of position in horizontal plane of the governor, driving-shaft, and pulley, which occurs when the belt breaks, the full lines showing the position assumed automatically when the belt becomes displaced and the dotted line showing the normal position when the belt is on the pulley, section being made at the line 5 5 on Fig. 3. Fig. 6 is a side elevation of the governor cut-off valve or gate. Fig. 7 is a side elevation of a cut-off valve or gate, the purpose of which is to predetermine the maximum access of steam to the engine when the the governor-driving pulley is disconnected.

A is the governor-valve body. B is the steam-induction pipe thereto. C is the steam-eduction pipe therefrom, leading to the engine-cylinder.

A' and $A^2$ are respectively the steam induction and eduction passages, into which the pipes B and C, respectively, are screwed. The steam-induction passage is partitioned by the horizontal web $A^{10}$, leaving the port $a^{10}$ above said partition and the port $a^{11}$ below it.

D is the governor-valve, which is a gate-valve, for which a suitable vertical way is formed in the valve-body A. The valve D is adapted to be inserted downward into the upper end of the valve-body and the guideway for it cuts through the horizontal partition $A^{10}$ and into the lower wall of the valve-body, and the valve is adapted to slide down into said lower portion and at its highest position to have its lower end entered into said lower portion, which is indicated by the letter $a$. The gate-valve D has a rectangular steam-port $d$ extending through it, the vertical width of said port being equal to that of each of the ports $a^{10}$ and $a^{11}$, and at the highest position of the valve this port $d$ coincides with the port $a^{10}$ and at the lowest position it registers more or less accurately with the lower port $a^{11}$. The exact registration or coincidence of these ports at the positions stated is not vital.

The stem D' of the valve D extends out through the plug E, which closes the upper end of the valve-body, covering the upper end of the slideway for the valve, and at the upper end of said plug there is provided a suitable stuffing-box E'.

F is a sleeve outside of the stem e of the plug E and provided with a flange F' at the lower end and adapted to be held rigid with the plug E by the set-screw or bolt $f$, which is inserted through the flange F' and binds against the stem of the plug. This sleeve is adapted to fit tightly on the plug, and since it is necessary to adjust it thereabout for certain purposes hereinafter stated the flange is provided, also, with the recess $f'$, adapted to receive the point of a spanner-wrench, whereby it may be thus adjusted.

G is the governor-frame—that is, the frame in which are journaled the horizontal governor-driving shaft H and the tubular shaft J, to the upper end of which the arms K' of the centrifugal balls K are pivoted.

I I are the usual intermeshing beveled gears on the shafts H and J, respectively, for communicating motion from the shaft H to the shaft J, and thence to the centrifugal balls.

L is the plunger, which is secured to the upper end of the valve-stem D' and which has the annular groove $l$, in which the ends of the arms K engage to raise and lower it as the balls are thrown out or fall inward.

$d'$ is a stop on the valve-stem D', and M is a lever-arm fulcrumed on the frame and apertured to permit the valve to pass through it, said arm being below the stop $e'$, so that it is adapted to arrest the downward movement of the piston with respect to the frame G, which is caused by the centrifugal movement of the balls.

N is an adjusting thumb-screw set through the lug G on the frame toward the outwardly-protruding end of the lever-arm M, the adjustment of which, therefore, determimes the lowest position to which the inner end of the lever-arm can descend, and therefore the position at which it will stop the descent of the the valve-stem when the stop $e'$ encounters it. This arm is preferably made elastic at its inner part, so that the stoppage of the stem will in no case be abrupt. The purpose of this adjustable device will be obvious to enable the engineer to limit the action of the governor and prevent it from operating to reduce the speed beyond a certain point.

P is a gate-valve, which is inserted upward through the lower side of the valve-body across the lower induction-passage $a^{11}$ and adapted, when fully closed, to seat in the under side of the partition $a^{10}$. Any customary means may be employed to adjust this valve. For convenience and simplicity it is shown as having its stem sliding in a stuffing-box P', sufficiently tight to hold it wherever it may be set, so that it may be employed to limit the access of steam through the passage $a^{11}$ to any desired amount from zero to the full capacity at that passage. The lower hub $G^2$ of the governor-frame G fits closely about and is adapted to slide longitudinally upon the sleeve F. Said hub has the oblique slot $g^2$, and into the sleeve F there is set the rigid stud $f^2$, which protrudes into said slot $g^2$. The inclination of the slot $g^2$ is such that the weight of the frame and the parts which are mounted upon it will cause it to descend, notwithstanding the engagement of the stud $f^2$ in said slot, and therefore in descending to make a partial rotation about the axis of the valve-stem, so that when prevented from so rotating it is thereby prevented from descending. When the governor is connected by the belt, the pulley H being put in proper position with respect to the driving-pulley from which the belt $H^2$ proceeds, the sleeve F will be turned on the plug E until the stud $f^2$ stands at or near the bottom of the slot $g^2$, as seen in Fig. 1, and in this position the set-screw $f$ will be tightened, securing the sleeve and plug together, and thereby making the sleeve rigid with the valve-body in that position. So long as the belt remains on the pulley, driving the same in normal manner, the tension of the belt will hold the governor-frame in the position described, and shown in Fig. 1. If the belt breaks or is displaced, this tension being relieved, the frame being thereby left free to make the rotary movement, it is free, also, to make the descending movement, and the whole weight of the frame G and the parts which it supports will operate to cause it to descend, and descending to force downward the valve-stem and gate-valve D to the lowest position which that valve can obtain. The first portion of this descending movement will carry the port $d$ out of line with the port $a^{10}$ and the upper portion of the gate-valve above the port $d$ will shut off the port $a^{10}$. As the valve further descends, the port D will come into line with the port $a^{11}$, and when the valve is at its lowest position, which it will reach almost instantly after the belt breaks, that port $a^{11}$ will have free discharge through the port $d$. The result of this change of position of the valve is that, whereas in the normal action the steam is admitted through the port $a^{10}$, it will now be admitted, if at all, through the port $a^{11}$. The port $a^{11}$ may be wholly or partly shut off by the gate P, and this gate having been set at the point of safety as respects the speed which can be produced with the amount of steam which can pass the gate, but also at a point which will admit sufficient steam to prevent cessation of the action of the engine, the breaking or displacement of the belt will neither permit the engine to "run away" nor cause it to be stopped. It will be observed that if the gate P is shut the effect is precisely the same as if there were no port $a^{11}$, and in its broadest phase my invention does not depend upon the use of the second port and the gate P.

It will be obvious that the essential characteristic of the connection shown between the valve-body and the governor-frame is that the movement of the frame with respect to the body, which is longitudinal with respect to the axis of the valve-stem, is inseparable from a rotary movement of the frame, and this rotary movement being about the axis along which the longitudinal movement occurs the whole movement of the frame is substantially helical. It will also be obvious that such helical or screw-like movement may be effected by various mechanical expedients which may differ specifically from that herein shown, and I do not limit myself to the specific device, though I claim it specifically as desirable and simple.

I claim—

1. In an engine-governor, in combination with the valve-body, the governor-frame connected thereto by a joint adapted to permit only substantially helical movement of the frame with respect to the valve-body about a vertical axis, the governor-valve having its stem extending vertically into the frame and connected to the governing devices on said frame, the governor-driving shaft journaled in the frame and extending horizontally, and the driving-pulley thereon, substantially as and for the purpose set forth.

2. In an engine-governor, in combination with the valve-body and the governor-frame connected thereto by a joint adapted to permit only substantially helical movement of the frame with respect to the body about a vertical axis, the valve which controls the steam-passages through the valve-body having its stem extending vertically into the frame and connected to the governing devices thereon, whereby it is adapted to be actuated longitudinally by said governing devices and also by the vertical movement of the frame, the governor-driving shaft extending horizontally and the pulley thereon, the valve-body having two ports, one above the other, connecting the steam-induction passage to the steam-eduction passage, and the valve having one port adapted to register with one of said ports at its highest position and with the other at its lowest and in each position to close the port with which it does not register, the lower port being provided with a cut-off valve or gate adjustable at will to limit the access of steam to such port, substantially as and for the purpose set forth.

3. In a governor, the valve-body provided at its upper end with a rigid cylinder through which the valve-stem emerges, the governor-frame terminating at the lower end in a hub having a cylindrical aperture which fits said cylindrical terminal of the body, said hub being obliquely slotted and the cylindrical terminal being provided with a rigid stud taking into said slot, the valve-stem extending up into the frame and connected to the governing devices, whereby it is adapted to be actuated longitudinally both by said devices and by vertical movement of the frame, the governor-driving shaft journaled horizontally in the frame and protruding therefrom, and the driving-pulley thereon, all combined and operating substantially as and for the purpose set forth.

4. In combination with the valve-body and the sliding valve therein, the plug E, through which the stem of the valve emerges, the sleeve F, encircling said plug and rotatably adjustable thereabout and provided with means for securing it as adjusted, the governor-frame swiveled on said sleeve and having the horizontal governor-driving shaft journaled in it, the hub of said frame having the oblique slot $g^2$, and the sleeve being provided with the rigid stud $f^2$, taking into said slot, substantially as set forth.

In testimony whereof I have hereunto set my hand, at Chicago, Illinois, in the presence of two witnesses, this 1st day of December, 1891.

THOMAS H. NACE.

Witnesses:
CHAS. S. BURTON,
JEAN ELLIOTT.